United States Patent [19]

Aubert et al.

[11] Patent Number: 4,544,531
[45] Date of Patent: Oct. 1, 1985

[54] URANIUM HEXAFLUORIDE PURIFICATION PROCESS

[75] Inventors: Jacques Aubert; Louis Bethuel; Maurice Carlès, all of Pierrelatte, France

[73] Assignee: Commissariat a l'Energie Atomique, Paris, France

[21] Appl. No.: 465,537

[22] Filed: Feb. 10, 1983

[30] Foreign Application Priority Data

Feb. 24, 1982 [FR] France .................. 82 03021

[51] Int. Cl.$^4$ ............................................. C01G 43/06
[52] U.S. Cl. ....................................... 423/19; 423/250; 423/251; 423/258
[58] Field of Search .................. 423/19, 258, 250, 251

[56] References Cited

U.S. PATENT DOCUMENTS

| | | | |
|---|---|---|---|
| 2,822,239 | 2/1958 | Brown et al. | 23/14.5 |
| 3,046,089 | 7/1962 | Steindler et al. | 423/19 |
| 3,178,258 | 4/1965 | Cathers et al. | 23/14.5 |
| 3,708,568 | 1/1973 | Golliher et al. | 423/19 |
| 4,172,114 | 10/1979 | Tsujino et al. | 423/19 |

FOREIGN PATENT DOCUMENTS

| | | |
|---|---|---|
| 2111730 | 6/1972 | France . |
| 50-108195 | 8/1975 | Japan ..................... 423/19 |
| 979884 | 1/1965 | United Kingdom . |

OTHER PUBLICATIONS

Gmelin Handbuch der Anorganischen Chemie, Partie C8, No. 55, 1980, Springer-Verlag, Berlin-Heidelberg-New York, p. 38.

Primary Examiner—Edward A. Miller
Attorney, Agent, or Firm—Pearne, Gordon, Sessions, McCoy, Granger & Tilberry

[57] ABSTRACT

A process for the purification of uranium hexafluoride containing traces of neptunium fluoride and/or plutonium fluoride, wherein the uranium hexafluoride to be purified is contacted with a metal fluoride chosen from the group including lead fluoride $PbF_2$, uranium fluorides of $UF_{4+x}$ in which x has a value between 0 and 1 and chromium trifluoride $CrF_3$, at a temperature such that the plutonium and/or neptunium fluorides are reduced, and wherein the thus purified uranium hexafluoride is recovered.

11 Claims, No Drawings

URANIUM HEXAFLUORIDE PURIFICATION PROCESS

BACKGROUND OF THE INVENTION

The present invention relates to a process for the purification of uranium hexafluoride containing traces of plutonium fluoride and/or neptunium fluoride.

It is known that one of the main sources of uranium hexafluoride for the separation of uranium isotopes by gaseous diffusion is the reprocessing of irradiated fuels. During the reprocessing, the fuels are generally treated by a wet process to separate the uranium, plutonium and other transuranium elements. At the end of this reprocessing, the uranium is generally recovered in the form of a uranium nitrate solution, which still contains traces of neptunium and plutonium producing alpha radiation of approximately 5000 d.p.m. (disintegrations per minute) per gram of uranium (UNIREP standard $<1500$ dpm g$^{-1}$U with for Pu/U$_{total}<10^{-8}$). This uranyl nitrate is then converted by fluorination into uranium hexafluoride, which therefore also contains traces of neptunium and plutonium in hexafluoride form. However, after the fluorination phase, the neptunium and plutonium activity is reduced. Nevertheless, it is desirable to reduce to the lowest possible value, the level of neptunium hexafluoride and plutonium hexafluoride in the uranium hexafluoride in order to introduce the minimum of $\alpha$ radioactive emitters, other than uranium isotopes, into isotopic separation plants. Moreover, the adoption of this process would make it possible to considerably reduce the presently accepted standard of 1500 $\alpha$ disintegrations, other than those of the uranium isotopes, per minute and per gram of uranium in UF$_6$ form.

The process hitherto used for purifying gaseous uranium hexafluoride containing plutonium hexafluoride or neptunium hexafluoride as impurities has consisted of fixing the volatile fluorides to a solid fluoride, such as sodium fluoride or magnesium fluoride, and then vaporizing in a preferred manner the uranium hexafluoride by heating the solid complex. Consideration has also been given to the use of other metal fluorides, such as cobalt fluoride and sulphur tetrafluoride, in order to selectively reduce the neptunium hexafluoride and plutonium hexafluoride and in this way to separate them from the uranium hexafluoride. Such processes are more particularly described in French Pat. Nos. 2,111,730, and 2,034,805, as well as in U.S. Pat. Nos. 3,046,089, 3,708,568 and 3,625,267.

However, such processes do not make it possible to purify under good conditions uranium hexafluoride which also contains traces of F$_2$ or ClF$_3$, because these highly fluorinating products firstly react on the cobalt fluoride CoF$_2$ in order to give CoF$_3$, which is a solid. This leads to the formation of a relatively impermeable crust, which is prejudicial to the reaction of the remaining CoF$_2$ with PuF$_6$ and NpF$_6$.

BRIEF SUMMARY OF THE INVENTION

The present invention relates to a process for the purification of gaseous uranium hexafluoride containing traces of plutonium hexafluoride and/or neptunium hexafluoride, which has the advantage of leading to uranium hexafluoride having a high purity level, even when it also contains F$_2$ and/or ClF$_3$.

The present invention therefore specifically relates to a process for the purification of uranium hexafluoride containing traces of neptunium fluoride and/or plutonium fluoride, wherein the uranium hexafluoride to be purified is contacted with a metal fluoride chosen from the group including lead fluoride PbF$_2$, uranium fluorides of UF$_{4+x}$ in which x has a value between 0 and 1 and chromium trifluoride CrF$_3$, at a temperature such that the plutonium and/or neptunium fluorides are reduced, and wherein the thus purified uranium hexafluoride is recovered.

Advantageously, when the metal fluoride is lead fluoride PbF$_2$, the uranium hexafluoride is contacted with the lead fluoride at a temperature between 70° and 150° C.

When the metal fluoride used is chromium trifluoride CrF$_3$, the uranium hexafluoride is contacted with the chromium trifluoride at a temperature between 70° and 200° C.

When the metal fluoride used is a uranium fluoride of UF$_{4+x}$, the uranium hexafluoride is contacted with the uranium fluoride at between 70° and 250° C.

In each case, the temperature is chosen in such a way as to obtain the greatest possible reactivity between the gases and the metal fluoride, whilst being compatible with maintaining a good surface stability of the metal fluoride used.

According to the invention, the metal fluoride can be used directly in the form of a powder or a powder placed on a support made from an inert material constituted e.g. by alumina balls or by a macroporous alumina or nickel tube. In the latter case, the macroporous tube is coated with a microporous metal fluoride power coating. Preferably, the metal fluoride powder has a specific surface of 1 to 25 m$^2$/g.

Thus, if the specific surface of the powder is too small, the latter will not have an adequate treatment capacity. However, with large specific surfaces, the powder has a good treatment capacity.

According to an embodiment of the process according to the invention, particularly suitable for the treatment of uranium hexafluoride also containing traces of fluorinating agents, such as fluorine or chlorine trifluoride, the uranium hexafluoride to be purified is firstly contacted with a uranium fluoride of formula UF$_{4+x}$ at a temperature between 70° and 250° C. The thus treated uranium fluoride is then contacted with a metal fluoride chosen from the group including cobalt fluoride CoF$_2$, lead fluoride PbF$_2$ and chromium trifluoride at a temperature such that the plutonium neptunium fluorides are reduced.

In this case, use is made of the property of uranium fluoride UF$_{4+x}$ of reacting with fluorinating agents to form volatile uranium hexafluoride, which obviates the formation of a relatively impermeable crust on the surface of the metal chloride and makes it possible to use all the uranium fluoride for reducing the neptunium and plutonium hexafluoride.

Preferably, for improving the results obtained, use is made of two successive traps, whereof the first (UF$_4$) ensures the elimination of fluorinating agents, such as fluorine and chlorine trifluoride, and the second (PbF$_2$, CrF$_3$ CoF$_2$ and even UF$_4$) makes it possible to improve the uranium hexafluoride purification level.

The process according to the invention is performed by using a reactor containing metal fluoride constituted by lead fluoride PbF$_2$, uranium UF$_{4+x}$ or chromium trifluoride CrF$_3$, in the form of a powder, granules or balls located in perforated plates. The uranium hexafluoride to be purified is circulated within this reactor.

It is also possible to use a reactor containing metal fluoride in the form of hollow cylindrical elements having a macroporous alumina or nickel support, coated with a microporous metal fluoride coating. In this case, coating generally takes place within the tubes and the composite hollow members are sealed at one of their ends and placed vertically in the reactor. The uranium hexafluoride to be purified is introduced into these members and then passes through the microporous coating of metal fluoride by percolation, so that a reaction occurs between the gases and the metal fluoride. In the case of composite hollow cylindrical members, it is also possible to use members externally coated with a microporous metal fluoride coating and in this case introduce the uranium hexafluoride externally of said members, whilst recovering the purified uranium hexafluoride within the hollow cylindrical members.

When the metal fluoride is in powder form, it is possible to use other treatment devices, particularly fixed or rotary bed installations.

Generally, contacting of the uranium hexafluoride with the metal fluoride takes place by operating under a pressure of 100 to 300 hPa, which must be lower than the $UF_6$ vapour pressure at the considered temperature.

The uranium hexafluoride flow rate is chosen as a function of the geometrical characteristics of the installation and the physical form (powder, balls, etc) of the fluoride used, in order to obtain the desired decontamination without an excessive pressure drop.

DESCRIPTION OF THE PREFERRED EMBODIMENTS

Other advantages and characteristics of the invention can be gathered from reading the following description of non-limitative embodiments.

EXAMPLE 1

This example illustrates the use of lead fluoride in pellet form and having a specific surface of $0.1\ m^2.g^{-1}$, obtained from a commercial powder (Riedel de Haën) for the purification of uranium hexafluoride containing 23 to 24 ppm of neptunium hexafluoride.

In this example, a cylindrical reactor is used, which has a diameter of 10 mm and an active area of length 750 mm. This active area is filled with lead fluoride pellets and at either end of the column of pellets are arranged pure alumina pellets for obtaining in operation a homogeneous temperature throughout the lead fluoride pellet column.

The lead fluoride pellets firstly undergo degassing at 150° C. for 3 hours under nitrogen scavenging and then 3 hours under vacuum.

Following degassing, uranium hexafluoride is introduced into the reactor, maintained at a temperature of 150° C., under a pressure of 950 hPa and a flow rate of 0.02 g of U/second, i.e. a surface speed of 2 $cm.s^{-1}$ for the first 25 minutes, then a flow rate of 0.081 g of U/second, or a surface speed of 16 $cm.s^{-1}$ for 2 hours 35 minutes. The neptunium content of the gas leaving the reactor is periodically determined by $\alpha$ count. At the end of the operation, the neptunium quantity fixed to the lead fluoride pellets is determined.

The results obtained are given in the following table 1. These results show that the neptunium decontamination factors F equal to the ratio:

$$F = \frac{NpF_6/UF_6 \text{ before purification}}{NpF_6/UF_6 \text{ after purification}}$$

is 540 to 550 at the start of the operation, which demonstrates that $PbF_2$ pellets are very effective in the selective reduction of neptunium. However, the treatment capacity of such pellets is more limited.

It is pointed out that the treatment capacity corresponds to the mass of uranium hexafluoride containing 1 ppm of neptunium hexafluoride able to be treated by 1 g of lead fluoride powder in order to obtain uranium hexafluoride containing no neptunium at the reactor outlet. This capacity is determined on the basis of the neptunium quantity fixed to the powder at the end of the operation, when the metal fluoride column is saturated with neptunium. In this example, the maximum capacity observed is 0.53 kg of $UF_6$/g of $PbF_2$.

EXAMPLE 2

This example relates to the purification of uranium hexafluoride containing 3 to 4 ppm of neptunium by means of $\alpha$ alumina balls impregnated with lead fluoride $PbF_2$ and which have been prepared in the following manner.

Lead oxide PbO is added in fractions to a fluosilicic acid $H_2SiF_6$ solution of 690 g/l, accompanied by stirring and in stoichiometric quantity, whilst maintaining the temperature at 40° C. The alumina balls are placed in a vacuum round-bottom flask. The previously obtained lead fluosilicate solution is introduced under vacuum and the balls are allowed to impregnate for two hours. The balls are separated from the solution excess, drained and dried under vacuum and between 30° and 40° C. After drying, the balls are slowly heated in a vacuum oven at 250° C. for 3 hours. This temperature is maintained for 3 hours, which ensures the thermal decomposition of the lead fluosilicate into lead fluoride. The amount of lead fluoride fixed is 21.9% and the BET specific surface of the impregnated balls is 0.26 $m^2/g$, which corresponds to a specific surface of approximately 1.2 $m^2/g$ for the lead fluoride.

The lead fluoride-impregnated alumina balls obtained in this way are placed in a reactor having a diameter of 8 mm and an active area of length 750 mm. As hereinbefore, pure alumina balls having a specific surface of approximately 0.1 $m^2/g$ are placed at either end. The impregnated balls undergo a degassing treatment under nitrogen at 150° C. for 2 hours. This is followed by pretreatment with sulphur tetrafluoride under a pressure of 270 hPa and at 150° C. for 2 hours, in order to eliminate any trace of water from the impregnated balls. Uranium hexafluoride containing 3 to 4 ppm of neptunium hexafluoride is then introduced into the reactor at a rate of 0.015 g of U/s, under a pressure of 700 hPa, which corresponds to a surface speed of 26.5 cm/s, whilst maintaining the reactor at a temperature of 150° C.

As in example 1, periodic determination takes place of the neptunium content of the gases leaving the reactor and at the end of the operation, the neptunium quantity fixed to the alumina balls is determined, in order to establish the maximum capacity. The results obtained are given in the following table 1.

EXAMPLE 3

The same operating procedure as in example 2 is followed, using the same lead fluoride-impregnated alumina balls and a diameter 10 mm, length 750 mm reactor, for treating uranium hexafluoride containing 21 to 25 ppm of neptunium. The uranium hexafluoride is introduced into the reactor at a rate of 0.0956 g of U/s, which corresponds to a surface speed of 17 cm/s, under a pressure of 900 hPa, whilst performing the test for 4 hours at a temperature of 150° C.

The results obtained are given in Table 1. It can be seen that the capacity is higher than in example 2, but the decontamination factors are lower than in examples 1 and 2.

EXAMPLE 4

In this example, use is made of lead fluoride $PbF_2$ powder, having a specific surface of 3.2 m$^2$/g. This powder is prepared from a lead silicate solution identical to that used in example 2 for impregnating the alumina balls. In this case, the lead fluosilicate solution is concentrated on a rotary evaporator at 45° C., so that solid crystals of lead fluosilicate $PbSiF_6, 4H_2O$ are obtained. These are then dried in the oven at 40° C. and decomposed under vacuum at a moderate temperature of 250° C. for 2 hours, which makes it possible to obtain a large specific surface.

In this example, a reactor is used comprising a tube made from a nickel alloy, known under the trade name Monel, in which are arranged 7 fritted Monel plates, between which is placed the lead fluoride powder. The tube is heated by electrical resistors enclosed in two pure copper half-shells, the temperature being contained constant at 150° C.

The power firstly undergoes degassing treatment for 2 hours at 150° C., accompanied by scavenging, followed by pretreatment at 150° C. for 2 hours, using sulphur tetrafluoride under a pressure of 260 hPa. Uranium hexafluoride containing 15 to 16 ppm of neptunium is then introduced into the reactor at a pressure of 800 to 900 hPa, a flow rate of 0.093 g of U/s for the first 20 minutes, a rate of 0.023 g/s for the following 70 minutes and finally a rate of 0.093 g of U/s up to the end of operation, which in all lasts 3 hours.

When the uranium flow rate is 0.023 g/s, the surface speed is 1.4 cm/s and when the uranium flow rate is 0.093 g of U/s, the surface speed is 6 cm/s.

As hereinbefore, the neptunium content of the gas leaving the reactor is periodically determined and at the end of the operation the neptunium weight fixed to the $PbF_2$ powder is determined. The results obtained are given in Table 1.

EXAMPLE 5

In this example, use is made of a platetype reactor identical to that of FIG. 4. Uranium tetrafluoride powder with a specific surface of 0.85 m$^2$/g is placed between the plates.

The powder firstly undergoes a vacuum degassing treatment for 2 hours at 100° C. and a pretreatment by means of sulphur tetrafluoride under a pressure of 130 hPa for 90 minutes at 100° C. Uranium hexafluoride containing 22 to 29 ppm of $NpF_6$ is then introduced into the reactor. Initially, working takes place at a temperature of 120° C. and a flow rate of 0.02 g of U/s, which corresponds to a surface speed of 1.2 cm/s for the first 45 minutes, a temperature of 120° C. with a flow rate of 0.079 g of U/s corresponding to a surface speed of 4.6 cm/s for the next 105 minutes, and finally a temperature of 150° C. with the same uranium flow rate (0.079 g of U/s) for the last 30 minutes. The total duration of the treatment is 3 hours and working takes place under a pressure of 800 to 900 hPa.

The results obtained are given in the following Table 2. It can be seen therein that at the start of the treatment, i.e. with a low flow rate at 120° C., the efficiency is low, because the decontamination factor is equal to 26, but then increases at the higher flow rate and then decreases again over the period of time.

When the temperature passes from 120° to 150° C., the efficiency increases again, but then progressively drops. This is due to the progressive $NpF_5$ and $NpF_4$ saturation of the uranium fluoride $UF_4$ or $UF_5$ or $U_2F_9$. The treatment capacity is excellent.

EXAMPLE 6

The same plate reactor is again used, which is again filled with uranium tetrafluoride powder having a specific surface of 0.85 m$^2$/g. The powder is degassed, accompanied by nitrogen scavenging at 100° C. for 2 hours, whilst sulphur tetrafuloride pretreatment takes place under the same conditions as in example 5. Into the reactor is then introduced uranium hexafluoride containing 32 to 41 ppm of $NpF_6$, at a flow rate of 0.081 g of U/s under a pressure of 900 hPa at a temperature of 70° C. for the first hour, then at 120° C. for the second hour and 150° C. for the third hour. Under these conditions, the surface speed of the gas is 3.4 cm/s$^{-1}$ for the first hour, 4 cm/s for the second hour and 4.2 cm/s for the third hour. As hereinbefore, the neptunium content of the gas leaving the reactor is periodically determined. At the end of the operation, the neptunium quantities fixed to the powder are also determined. The results obtained are given in Table 2. The results given in the table make it clear that maximum efficiency is obtained at 150° C.

EXAMPLE 7

In this example, use is made of pellets based on chromium trifluoride $CrF_3$ having a specific surface of 5.3 m$^2$/g. These pellets are prepared by compressing a chromium trifluoride-based powder obtained in the following way.

Chromium hydroxide $Cr(OH)_3$ powder is added to an aqueous solution of 50% hydrofluoric acid in the proportion 15 moles of $Cr(OH)_3$ to 46 moles of HF. The $Cr(OH)_3$ is added, accompanied by stirring at a temperature kept constant at 80° C. It is then allowed to cool, the precipitate is filtered and dried at 100° C., which gives a $CrF_33H_2O$ powder. This powder is then pelleted by means of a punch press in order to form small cylinders of dimensions 4×4 mm. These pellets are then decomposed in a vacuum furnace at 275° C. for 3 hours, in order to obtain pellets containing chromium trifluoride. These pellets are introduced into a reactor, like that used in examples 1 to 3. They then undergo a degassing treatment, firstly carried out under nitrogen scavenging at 150° C. for 3 hours, then under vacuum for 3 hours at 150° C.

Uranium hexafluoride containing 20 to 31 ppm of $NpF_6$ is then introduced into the reactor kept at 150° C. and under a pressure of 1000 hPa and a flow rate of 0.02 g U/s, which corresponds to a surface speed of 4 cm/s, for 95 minutes, and at a flow rate of 0.081 g of U/s, which corresponds to a surface speed of 16 cm/s up to the end of the operation, which lasts in all 185 minutes.

The neptunium content of the gas leaving the reactor is periodically determined and at the end of the operation the neptunium quantities fixed to the chromium trifluoride-based pellets is determined. The results obtained are given in table 2.

EXAMPLE 8

In this example, use is made of 4×4 mm chromium trifluoride-based pellets, having a specific surface of 8 m$^2$/g. They are obtained in the same way as in example 7, but the thermal decomposition of the CrF$_3$, 3H$_2$O is carried out under a primary vacuum ($10^{-1}$ hPa) by progressively raising, over a 2 hour period, the temperature to 275° C. and maintaining this temperature level for 3 hours.

These pellets are placed in a reactor having a diameter of 10 mm and an active area of length 7 mm. Pure alumina pellets having a specific surface of 0.1 m$^2$/g are placed at each end of the column of CrF$_3$ pellets. The pellets then undergo degassing treatment, performed firstly under nitrogen scavenging at 150° C. for 3 hours and then under vacuum at 150° C. for 3 hours. Uranium hexafluoride is then introduced into the rector under a pressure of 900 hPa, whilst maintaining the reactor at 150° C., with a flow rate of 0.02 g U/s, which corresponds to a surface speed of 4 cm/s for the first hour, then a flow rate of 0.081 g of U/s corresponding to a surface speed of 15 cm/s for the two following hours.

The neptunium content of the gas leaving the reactor is periodically determined and at the end of the operation the neptunium quantity fixed to the CrF$_3$-based pellets is determined.

The results obtained are given in Table 2. This table shows that the decontamination factor varies with time, because saturation is very speedily reached. The maximum capacity is 3.8 kg of uranium hexafluoride at 1 ppm of neptunium/gram of chromium fluoride.

TABLE 1

| Example | 1 | | 2 | | 3 | | 4 | |
|---|---|---|---|---|---|---|---|---|
| PbF$_2$ | Pellets 0.1 m$^2$·g$^{-1}$ | | Impregnated balls 1.2 m$^2$·g$^{-1}$ | | Impregnated balls 1.2 m$^2$·g$^{-1}$ | | Powder 3 m$^2$·g$^{-1}$ | |
| Np content | Np (ppm) | F | Np (ppm) | F | Np (ppm) | F | Np (ppm) | F |
| on entry | 23–24 | | 3.4 | | 21–25 | | 15–16 | |
| at exit after 5 mins | | | | | 2.30 | 8 | | |
| 10 | | | 0.19 | 16 | | | | |
| 25 | 0.042 | 540 | | | | | 0.044 | 34 |
| 30 | | | 0.15 | 22 | 8.54 | 2.3 | | |
| 35 | | | | | | | 0.058 | 26 |
| 45 | | | | | | | 0.044 | 34 |
| 60 | 0.043 | 550 | | | 10.79 | 1.9 | | |
| 90 | 0.179 | 140 | 0.049 | 73 | | | 0.057 | 260 |
| 120 | 0.087 | 205 | 0.099 | 38 | 6.61 | 3.4 | | |
| 140 | 0.022 | 1200 | | | | | | |
| 150 | | | 0.103 | 38 | | | 0.047 | 325 |
| 170 | 0.028 | 814 | | | | | | |
| 180 | | | | | 8.08 | 3.0 | 0.052 | 300 |
| 240 | | | | | 10 | 2.6 | | |
| Max. capacity observed in kg of UF$_6$ at 1 ppm of NpF$_6$/g of PbF$_2$ | 0.53 | | 1.84 | | 2 | | 10 | |

TABLE 2

| Example | 5 | | 6 | | 7 | | 8 | |
|---|---|---|---|---|---|---|---|---|
| Metal fluoride | UF$_4$ powder 0.85 m$^2$g$^{-1}$ | | UF$_4$ powder 0.85 m$^2$g$^{-1}$ | | CrF$_3$ pellets 5.3 m$^2$g$^{-1}$ | | CrF$_3$ pellets 8 m$^2$g$^{-1}$ | |
| nP content | Np (ppm) | F | Np (ppm) | F | Np (ppm) | F | Np (ppm) | F |
| on entry | 22–29 | | 32–41 | | 32–41 | | 23–36 | |
| at exit after 5 minutes | | | | | | | | |
| 10 | | | | | | | | |
| 25 | 1.049 | 26 | | | 0.052 | 420 | 0.89 | 27 |
| 30 | | | 32.84 | | | | | |
| 35 | 0.039 | 700 | | | | | | |
| 40 | | | 4.57 | 7.4 | | | | |
| 45 | 0.017 | 1600 | | | | | | |
| 60 | | | 4.66 | 7.3 | 0.087 | 275 | 10.5 | 2.3 |
| 70 | | | | | | | | |
| 75 | | | 2.25 | 15.3 | | | | |
| 80 | | | | | | | | |
| 90 | 0.134 | 210 | | | 0.111 | 230 | 7.2 | 3.4 |
| 120 | | | 2.67 | 13.7 | 0.142 | 125 | 11.5 | 2.2 |
| 135 | | | 0.899 | 40.6 | | | | |
| 140 | | | | | 0.082 | 128 | 12.4 | 2 |
| 150 | 1.67 | 17 | | | | | | |
| 170 | | | | | 0.147 | 210 | 12.5 | 2.1 |
| 180 | 0.61 | 47 | 1.24 | 30.7 | | | | |
| 185 | | | | | | | | |

TABLE 2-continued

| Example | 5 | 6 | 7 | 8 |
|---|---|---|---|---|
| Max. capacity observed in kg of $UF_6$ at 1 ppm of $NpF_6$/ g of $UF_4$ or $CrF_3$ | 30 | 27 | 1.2 | 3.8 |

What is claimed is:

1. A process for the purification of a uranium hexafluoride composition containing traces of neptunium fluoride and/or plutonium fluoride comprising:

(a) contacting said uranium hexafluoride composition to a metal fluoride chosen from the group including lead fluoride $PbF_2$, uranium fluorides of $UF_{4+x}$, in which x has a value between 0 and 1, and chromium trifluoride, at a contacting temperature such that the plutonium and/or neptunium fluorides are reduced, and thereafter recovering the purified uranium hexafluoride composition.

2. A process according to claim 1, wherein the metal fluoride is lead fluoride, and the contacting temperature is between 70° C. and 150° C.

3. A process according to claim 1, wherein the metal fluoride is chromium fluoride, $CrF_3$, and the contacting temperature is between 70° and 200° C.

4. A process according to claim 1, wherein the metal fluoride is uranium fluoride of $UF_{4+x}$, in which x has a value between 0 and 1, and the contacting temperature is between 70° and 250°.

5. A process according to claim 1, wherein the metal fluoride is in the form of a powder.

6. A process according to claim 5, wherein the powder has a BET specific surface of 1 to 25 $m^2/g$.

7. A process according to claim 5, wherein the metal fluoride is placed on an inert support.

8. A process according to claim 7, wherein the inert support is constituted by alumina balls.

9. A process according to claim 7, wherein the inert support is constituted by a macroporous alumina or nickel tube, coated with a microporous metal fluoride coating.

10. A process according to any one of claims 1 or 5 to 9, wherein the uranium hexafluoride composition also contains traces of a fluorinating agent, and including the subsequent step of contacting the purified uranium hexafluoride composition with a further metal fluoride purifying agent chosen from the group including cobalt fluoride $CoF_2$, lead fluoride $PbF_2$, and chromium trifluoride.

11. A process according to claim 4, and including the subsequent step of contacting the purified uranium hexafluoride composition with a further metal fluoride purifying agent chosen from the group including cobalt fluoride $CoF_2$, lead fluoride $PbF_2$, and chromium trifluoride.

* * * * *

UNITED STATES PATENT AND TRADEMARK OFFICE
CERTIFICATE OF CORRECTION

PATENT NO. : 4,544,531

DATED : October 1, 1985

INVENTOR(S) : Aubert et al.

It is certified that error appears in the above—identified patent and that said Letters Patent are hereby corrected as shown below:

Column 3, line 25, "300" should read as --3000--

Signed and Sealed this

Seventeenth Day of December 1985

[SEAL]

Attest:

DONALD J. QUIGG

Attesting Officer

Commissioner of Patents and Trademarks